3,227,760
N,N-MONO- AND DI-SUBSTITUTED-ARALKYL AMINES

Sidney B. Richter and David P. Mayer, Chicago, Ill., assignors to Velsicol Chemical Corporation, Chicago, Ill., a corporation of Illinois
No Drawing. Filed July 10, 1962, Ser. No. 208,930
6 Claims. (Cl. 260—570.9)

This invention relates to the production of new pesticidal compositions of matter. More specifically, this invention relates to new chemical compounds of the general formula

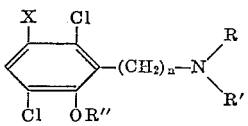

wherein X is hydrogen or chlorine, $n$ is a whole number from 1 to 3, R″ is lower unsubstituted alkyl, and R and R′ are also as defined above. Preferred starting materials lower alkenyl radicals are meant those containing up to four carbon atoms. The new compounds of this invention are useful as pesticides, particularly as insecticides, miticides, and herbicides.

The new compounds of this invention can be prepared by the condensation of compounds of the formula

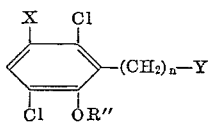

wherein $n$, R″ and X are as defined above and Y is chlorine or bromine with amines HNRR′, wherein R and R′ are also as defined above. Preferred starting materials of the given formula are either 2-methoxy-3,6-dichlorobenzyl chloride or 2-methoxy-3,5,6-trichlorobenzyl chloride, which can be obtained conveniently from carboxylic acid esters of 2-methoxy-3,6-dichlorobenzoic acid or 2-methoxy-3,5,6-trichlorobenzoic acid, respectively, by reduction to the corresponding benzyl alcohol with a reagent such as lithium aluminum hydride, followed by treatment with a reagent such as thionyl chloride to form the desired benzyl chloride. Starting materials where $n$ is two can be prepared by the same reaction steps starting from carboxylic acid esters of 2-methoxy-3,6-dichlorophenylacetic acid or 2-methoxy-3,5,6-trichlorophenylacetic acid. Starting materials wherein —OR″ is butoxy, for example, can be obtained similarly from carboxylic acid esters of 2-butoxy-3,6-dichlorobenzoic acid or 2-butoxy-3,5,6-trichlorobenzoic acid, themselves obtainable from the 3,6-dichloro- and 3,5,6-trichlorosalicylic acids by treatment with butyl iodide and silver oxide.

If it is desired to prepare compounds of this invention where $n$ is three, suitable starting materials can be obtained from 2,5-dichlorophenol or 2,4,5-trichlorophenol. For example, treatment of the phenol with allyl bromide in the presence of potassium carbonate yields the allyl ether, which can then be rearranged by heating to form the phenol wherein an allyl group is present on the ring ortho to the phenolic OH. Treatment of the intermediate with HBr in the presence of peroxide, for example, then gives the desired 2-methoxy-3,6-dichloro(3-bromopropyl)-benzene or 2 - methoxy - 3,5,6 - trichloro(3-bromopropyl)-benzene.

Suitable reactants of the formula HNRR′ include ammonia and a wide variety of primary and secondary amines wherein R and R′ are as defined above. Some typical suitable reactants are, for example, isopropylamine, di-n-propylamine, dimethylamine, ethanolamine, methylamine, diethylamine, di-tert-butylamine, allylamine, diallylamine, 4 - amino - 1 - butanol, 3-amino-1-butanol, diethanolamine, methylethylamine, and the like.

When the condensation reaction to form the new compounds of this invention is carried out, at least two moles of the amine should be used for each mole of the chloride or bromide, since the hydrogen halide released during the reaction is taken up by some of the free amine. The reaction can be carried out conveniently by heating the reactants, preferably in an inert solvent such as benzene or toluene. The exact reaction temperatures are not critical, since the reaction will often take place at normal room temperature; however, temperatures which are the normal reflux temperature of the reaction mixture are preferred. The reaction will often be complete in a few hours. Generally, a precipitate of amine hydrochloride or hydrobromide will form in the reaction mixture and can be filtered off. The product can be isolated from the reaction mixture by ether extraction; and it can be purified by crystallization, fractional distillation, or other techniques known to the art. Although the reaction is normally carried out at atmospheric pressure, sub- or super-atmospheric pressures can also be used if desired.

The manner in which typical new compounds of this invention can be prepared is illustrated in the following examples. All temperatures are in degrees centigrade.

EXAMPLE 1

*Preparation of 2-methoxy-3,6-dichlorobenzyl alcohol*

Lithium aluminum hydride (117 g.; 3.0 moles) was stirred with about 2.5 l. of anhydrous ether in a 5-l. flask. A dried solution of methyl 2-methoxy-3,6-dichlorobenzoate (705 g.; 3.0 moles) in 1.5 l. of ether was added dropwise with stirring over a period of 1 hr. The temperature of the reaction mixture was maintained at about —40° by external cooling. After the addition, the stirring was continued for 3.5 hrs., during which time the temperature was allowed to rise to 0°. Water was then added until the evolution of hydrogen nearly ceased, after which a 20% solution of HCl was added until two layers separated. The ether layer was separated and combined wtih an ether extraction of the aqueous layer. The ether solution was dried over magnesium sulfate, filtered, and evaporated on the steam bath to give a residue which solidified on cooling to 597 g. (96% of theory) of white 2-methoxy-3,6-dichlorobenzyl alcohol, M.P. 63–67°.

EXAMPLE 2

*Preparation of 2-methoxy-3,6-dichlorobenzyl chloride*

2-methoxy-3,6-dichlorobenzyl alcohol (564 g.; 2.72 moles), pyridine (215 g.; 2.72 moles), and 3-l. toluene were placed in a 5-l. flask. Thionyl chloride (700 g.; 5.8 moles) was added dropwise with stirring over a period of 0.5 hr. The mixture was refluxed for 5 hrs. and filtered. The filter cake was washed thrice with 200-ml. portions of benzene; and the benzene washings were combined with the toluene solution. The combined solution was evaporated under reduced pressure, and the residue was distilled in vacuo to give 497 g. (81% of theory) of light tan 2-methoxy-3,6-dichlorobenzyl chloride, B.P. 100°/0.6 mm., which solidified on standing.

EXAMPLE 3

*Preparation of N-isopropyl-2-methoxy-3,6-dichlorobenzylamine*

A mixture of 2-methoxy-3,6-dichlorobenzyl chloride (250 g.), isopropylamine (133 g.), and 500 ml. of benzene was refluxed for 8 hrs, in a 2-l. flask. After cooling, the reaction mixture was treated with 500 ml. of 10% NaOH solution and then shaken with 500 ml. of benzene.

The benzene layer was washed with water, dried over sodium sulfate, filtered, and evaporated. The residue was fractionally distilled under reduced pressure to give 217.5 g. (78% of theory) of light yellow N-isopropyl-2-methoxy-3,6-dichlorobenzylamine, B.P. 100°/0.25 mm. The product B.P. 101–2°/05 mm., from a similar run was analyzed.

Analysis for $C_{11}H_{15}Cl_2NO$:
Theory percent C 53.24 H 6.09 Cl 28.58 N 5.64
Found percent C 53.40 H 6.30 Cl 28.71 N 5.75

EXAMPLE 4

*Preparation of N,N-di-n-propyl-2-methoxy-3,6-dichlorobenzylamine*

A mixture of 2-methoxy-3,6-dichlorobenzyl chloride (23 g.; 0.1 mole), di-n-proplyamine (20 g.; 0.2 mole), and 100 ml. benzene was stirred and refluxed for 8 hrs. in a 250-ml. flask protected with a drying tube. On cooling, the precipitated solid was filtered off; and the benzene solution was extracted with 200 ml. of 20% HCl. The acid solution was made basic with aqueous NaOH solution and extracted thrice with ether. The combined ether extracts were washed with water, dried over magnesium sulfate, filtered, and evaporated. The residue was distilled in vacuo to give a 72.4% yield of N,N-di-n-propyl - 2 - methoxy - 3,6 - dichlorobenzylamine, B.P. 102°/0.15 mm.

Analysis for $C_{14}H_{21}Cl_2NO$:
Theory percent C 57.93 H 7.29 Cl 24.43 N 4.83
Found percent C 57.96 H 7.02 Cl 24.39 N 4.79

EXAMPLE 5

*Preparation of N,N-dimethyl-2-methoxy-3,6-dichlorobenzylamine*

A mixture of 17 g. of 2-methoxy-3,6-dichlorobenzyl chloride and 25 g. of 40% aqueous dimethylamine was stirred and refluxed for 5 hrs. in a 250 ml. flask. It was cooled to room temperature, treated with 200 ml. of 20% HCl, and extratced twice with ether. The aqueous portion was then made basic with aqueous NaOH and extracted twice with 100-ml. portions of ether. The combined ether extracts were washed with water, dried over magnesium sulfate, filtered, and evaporated. The residue was distilled under reduced pressure to give 12 g. (65% of theory) of yellow N,N-dimethyl-2-methoxy-3,6-dichlorobenzylamine, B.P. 78°/0.3 mm.

Analysis for $C_{10}H_{13}Cl_2NO$:
Theory percent C 51.30 H 5.60 Cl 30.29 N 5.98
Found percent C 51.25 H 5.86 Cl 30.23 N 6.08

EXAMPLE 6

*Preparation of N-(2-hydroxyethyl)-2-methoxy-3,6-dichlorobenzylamine*

A mixture of 2-methoxy-3,6-dichlorobenzyl chloride (23 g.; 0.1 mole), 20 g. of ethanolamine, and 100 ml. benzene was stirred and refluxed for 6 hrs. in a 500-ml. flask. After cooling, 80 ml. of 5% aqueous NaOH solution and 100 ml. of ether were added; and the organic layer was separated, washed with water, dried over magnesium sulfate, filtered, and evaporated. The residue was vacuum distilled to give 13 g. of light green viscous N-(2 - hydroxyethyl) - 2 - methoxy - 3,6 - dichlorobenzylamine, B.P. 132°/0.2 mm.

Analysis for $C_{10}H_{13}Cl_2NO_2$:
Theory percent C 48.01 H 5.24 Cl 28.35 N 5.20
Found percent C 48.51 H 5.48 Cl 27.97 N 5.64

A wide variety of other new chemical compounds within the scope of this invention can be prepared in a manner similar to that detailed above. Given in the following examples are the reactants which can be used to give the indicated named compounds of this invention.

EXAMPLE 7

2 - methoxy - 3,6 - dichlorobenzyl chloride+methylamine=N-methyl-2-methoxy-3,6-dichlorobenzylamine.

EXAMPLE 8

2 - methoxy - 3,5,6-trichlorobenzyl chloride+diethylamine=N,N-diethyl - 2 - methoxy - 3,5,6 - trichlorobenzylamine.

EXAMPLE 9

2 - methoxy - 3,6 - dichlorobenzyl chloride+n-butylamine=N-n-butyl-2-methoxy-3,6-dichlorobenzylamine.

EXAMPLE 10

2-methoxy-3,5,6-trichlorobenzyl chloride+di-tert - butylamine=N,N-di-tert-butyl-2-methoxy-3,5,6 - trichlorobenzylamine.

EXAMPLE 11

2 - methoxy - 3,6 - dichlorobenzyl chloride+allylamine =N-allyl-2-methoxy-3,6-dichlorobenzylamine.

EXAMPLE 12

2-methoxy-3,5,6-trichlorobenzyl chloride+diallylamine =N,N-diallyl-2-methoxy-3,5,6-trichlorobenzylamine.

EXAMPLE 13

2-methoxy-3,6-dichlorobenzyl chloride+4 - amino - 1-butanol=N-(4-hydroxybutyl)-2-methoxy-3,6 - dichlorobenzylamine.

EXAMPLE 14

2-methoxy-3,5,6-trichlorobenzyl chloride+3 - amino-1-butanol=N-(3-hydroxy-1-methylpropyl) - 2 - methoxy-3,5,6-trichlorobenzylamine.

EXAMPLE 15

2 - methoxy - 3,6 - dichlorobenzyl chloride+ammonia =2-methoxy-3,6-dichlorobenzylamine.

EXAMPLE 16

2-methoxy - 3,5,6 - trichlorobenzyl chloride+ammonia =2-methoxy-3,5,6-trichlorobenzylamine.

EXAMPLE 17

2-methoxy - 3,6 - dichlorobenzyl chloride+diethanolamine=N,N-di(2-hydroxyethyl)-2-methoxy-3,6 - dichlorobenzlamine.

EXAMPLE 18

2-methoxy-3,6-dichloro(2 - chloroethyl)benzene+ isopropylamine=N-isopropyl-2-methoxy-3,6 - dichlorophenethylamine.

EXAMPLE 19

2-methoxy-3,6-dichloro(3 - bromopropyl)benzene+dimethylamine=N,N-dimethyl-3(2-methoxy-3,6 - dichlorophenyl)-propylamine.

For practical use as pesticides, the compounds of this invention are generally incorporated into herbicidal, insecticidal, and miticidal compositions which comprise an inert carrier and a pesticidally toxic amount of such a compound. Such compositions, which are usually known in the art as formulations, enable the active compound to be applied conveniently to the site of the past infestation in any desired quantity. The compositions can be solids such as dusts, granules, or wettable powders; or they can be liquids such as solutions or emulsifiable concentrates.

For example, dusts can be prepared by grinding and blending the active compound with a solid inert carrier such as the talcs, clays, silicas, pyropyhyllite, and the like. Granular formulations can be prepared by impregnating the compound, usually dissolved in a suitable solvent, on to and into granulated carriers such as the attapulgites or the vermiculites, usually of a particle size range of from about 0.3 to 1.5 mm. Wettable powders, which can be dispersed in water to any desired concentration of the active compound, can be prepared by incorporating wetting agents into concentrated dust compositions.

In some cases the active compounds are sufficiently soluble in common organic solvents such as kerosene or xylene so that they can be used directly as solutions in these solvents. Frequently, solutions of insecticides can be dispersed under superatmospheric pressure as aerosols. However, preferred liquid compositions are emulsifiable concentrates, which comprise an active compound according to this invention and as the inert carrier, a solvent and an emulsifier. Such emulsifiable concentrates can be diluted with water to any desired concentration of active compound for application as sprays to the site of the pest infestation. The emulsifers most commonly used in these concentrates are nonionic or mixtures of nonionic with anionic surface-active agents.

A typical composition according to this invention is illustrated by the following example, in which the quantities are in parts by weight.

EXAMPLE 20

*Preparation of a dust*

| | |
|---|---|
| Product of Example 3 | 10 |
| Powdered talc | 90 |

The above ingredients are mixed in a mechanical grinder-blender and are ground until a homogeneous, free-flowing dust of the desired particle size is obtained. This dust is suitable for direct application to the site of the pest infestation.

The pesticides of this invention can be applied in any manner recognized by the art. The concentration of the new compounds of this invention in the compositions will vary greatly with the type of formulation and the purpose for which it is designed, but generally the compositions will comprise from about 0.05 to about 95 percent by weight of the active compounds of this invention. In a preferred embodiment of this invention, the compositions will comprise from about 5 to about 75 percent by weight of the active compound. The compositions can also comprise such additional substances as other pesticides, spreaders, adhesives, stickers, fertilizers, activators, synergists, and the like.

The new compounds of this invention can be used in many ways for the control of insects and mites. Insecticides which are to be used as stomach poisons or protective materials can be applied to the surface on which the insects feed or travel. Insecticides which are to be used as contact poisons or eradicants can be applied directly to the body of the insect, as a residual treatment to the surface on which the insect may walk or crawl, or as a fumigant treatment of the air which the insect breathes. In some cases, the compounds applied to the soil or plant surfaces are taken up by the plant, and the insects are poisoned systemically.

The above methods of using insecticides are based on the fact that almost all the injury done by insects is a direct or indirect result of their attempts to secure food. Indeed, the large number of destructive insects can be classified broadly on the basis of their feeding habits. There are, for example, the chewing insects such as the Mexican bean beetle, the southern armyworm, cabbageworms, grasshoppers, the Colorado potato beetle, the cankerworm, and the gypsy worm. There are also the piercing-sucking insects, such as the pea aphid, the house fly, the chinch bug, leafhoppers, and plant bugs.

Another group of insects comprises the internal feeders. These include borers such as the European corn borer and the corn earworm; worms or weevils such as the codling moth, cotton boll weevil, plum curculio, melonworm, and the apple maggot; leaf miners such as the apple leaf miner and the beet leaf miner; and gall insects such as the wheat jointworm and grape phylloxera. Insects which attack below the surface of the ground are classified as subterranean insects and include such destructive pests as the wooly apple aphid, the Japanese beetle, and the corn rootworm.

Mites and ticks are not true insects. Many economically important species of mites and ticks are known, including the red spider mite, the strawberry spider mite, the cattle tick, and the poultry mite. Chemicals useful for the control of mites are often called miticides, while those useful for the control of both mites and ticks are known specifically as acaricides.

The quantity of active compound of this invention to be used for insect control will depend on a variety of factors, such as the specific insect involved, intensity of the infestation, weather, type of environment, type of formulation, and the like. For example, the application of only one or two ounces of active chemical per acre may be adequate for control of a light infestation of an insect under conditions unfavorable for its feeding, while a pound or more of active compound per acre may be required for the control of a heavy infestation of insects under conditions favorable to their development.

Weeds are undesirable plants in their growing where they are not wanted, having no economic value, and interferring with the production of cultivated crops or with the welfare of livestock. Many types of weeds are known, including annuals such as pigweed, lambquarters, yellow foxtail, crabgrass, wild mustard, French-weed, rye-grass, goose-grass, chickweed, and smartweed; biennials such as wild carrot, great burdock, mullein, round-leaved mallow, blue thistle, bull thistle, hounds-tongue, moth mullein, and purple star thistle; or perennials such as white cockle, perennial rye-grass, quackgrass, Johnson grass, Canada thistle, hedge bindweed, Bermuda grass, sheep sorrel, field chickweed, and winter-cress. Similarly, such weeds can be classified as broad-leaf or grassy weeds. It is economically desirable to control the growth of such weeds without damaging beneficial plants or livestock.

The new compounds of this invention are particularly valuable for weed control because they are toxic to many species and groups of weeds while they are relatively nontoxic to many beneficial plants. The method of this invention for the control of weeds comprises contacting said weeds with a herbicidal composition comprising an inert carrier and as the essential active ingredient, in a quantity which is herbicidally toxic to said weeds, a compound of this invention. The exact amount of compound required will depend on a variety of factors, including the hardiness of the particular weed species, weather, method of application, the kind of beneficial plants in the same area, and the like. Thus, while the application of up to only about one or two ounces of an active compound per acre may be sufficient for good control of a light infestation of weeds growing under adverse conditions, the application of one pound or more of active compound per acre may be required for good control of a dense infestation of hardy weeds growing under favorable conditions.

The insecticidal activity of the new compounds of this invention can be illustrated by a variety of tests known to the art. For example, candidate compounds were formulated at a concentration of 0.35% on a weight/volume basis, with 100 ml. distilled water, 0.5 ml. benzene as solvent, and 0.5 ml. Triton X-100 (an alkyl aryl polyether alcohol emulsifier). In tests on houseflies, fifty adults of the Chemical Specialties Manufactures' Association strain were sprayed with the test emulsion in a 2 x 5 inch diameter stainless steel cage faced on top and bottom with 14-mesh screen. The flies were retained in the cage in which they were sprayed for knockdown observation. In these tests, the compounds N-isopropyl- and N,N-di-n-propyl-2-methoxy-3,6-dichlorobenzylamine both gave 100% knockdown of the flies in two hours.

In further tests, adult pea aphids were sprayed with the test emulsions, transferred to sprayed pea plants, and held for 48-hour mortality determinations. The compounds N-isopropyl-, N,N-di-n-propyl-, and N,N-dimethyl-2-methoxy-3,6-dichlorobenzylamine gave 100%, 100%, and 90% mortalities, respectively, of the pea aphid. Many of the compounds were also active against mites such as the strawberry spider mite.

The herbicidal activity of the new compounds of this invention can also be illustrated by many of the testing techniques known to the art. For example, experiments were carried out in which duplicate paper pots filled with a sand and soil mixture were seeded with weeds, Immediately after seeding, the soil surface of each pot was sprayed with a test solution formulated at the equivalent concentration of 4 lbs./acre. Growth was maintained under artificial lighting with irrigation provided by placing the porous pots in a small amount of water in stainless steel trays. The weeds were observed for a week to ten days; and percent kill, injury, and stand reduction were recorded. In these experiments, many of the compounds of this invention were toxic to mustard and to pigweed while untreated controls showed normal growth. In comparable post-emergence experiments in which the weeds were sprayed about ten days after seeding, many of the compounds of this invention were toxic to pigweed and to crabgrass, again where untreated control plants were normal.

What is claimed is:
1. A compound of the general formula

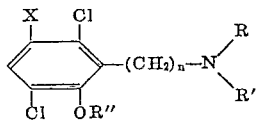

wherein $n$ is a whole number from 1 to 3, X is selected from the group consisting of hydrogen and chlorine, R'' is lower unsubstituted alkyl, and R and R' are selected from the group consisting of unsubstituted lower alkyl radicals, unsubstituted lower alkenyl radicals, lower monohydroxyalkyl radicals, and hydrogen.

2. 2-methoxy-3,6-dichlorobenzylamine.
3. N-isopropyl-2-methoxy-3,6-dichlorobenzylamine.
4. N,N-di-n-propyl-2-methoxy-3,6-dichlorobenzylamine.
5. N,N-dimethyl-2-methoxy-3,6-dichlorobenzylamine.
6. N-(2-hydroxyethyl)-2-methoxy-3,6-dichlorobenzylamine.

References Cited by the Examiner
UNITED STATES PATENTS

| | | | |
|---|---|---|---|
| 2,608,584 | 8/1952 | Sprules et al. | 260—570.9 |
| 2,763,616 | 9/1956 | Brooks | 260—570.9 X |
| 2,783,277 | 2/1957 | Hiltmann | 260—570.9 |
| 2,862,966 | 12/1958 | Surrey | 260—570.9 X |
| 2,864,679 | 12/1958 | Hamm et al. | 71—2.3 |
| 2,927,053 | 3/1960 | Eden | 260—570.9 |
| 2,962,531 | 11/1960 | Coffield | 260—570.9 |
| 2,981,619 | 4/1961 | Josephs | 71—2.3 |
| 3,070,628 | 12/1962 | Lemin | 260—570.9 |
| 3,072,472 | 1/1963 | Josephs | 71—2.3 |

OTHER REFERENCES

Benington et al.: "Jour. Organic Chem.," vol. 23, pp. 1979–84 (1958) Merchant et al., "Jour. Organic Chem., vol. 23, pp. 1774–6 (1958).

CHARLES B. PARKER, *Primary Examiner.*

JULIAN S. LEVITT, *Examiner.*